H. ROTTENBURG.
CAMERA STAND.
APPLICATION FILED APR. 25, 1914.
1,138,417.
Patented May 4, 1915.
2 SHEETS—SHEET 1.
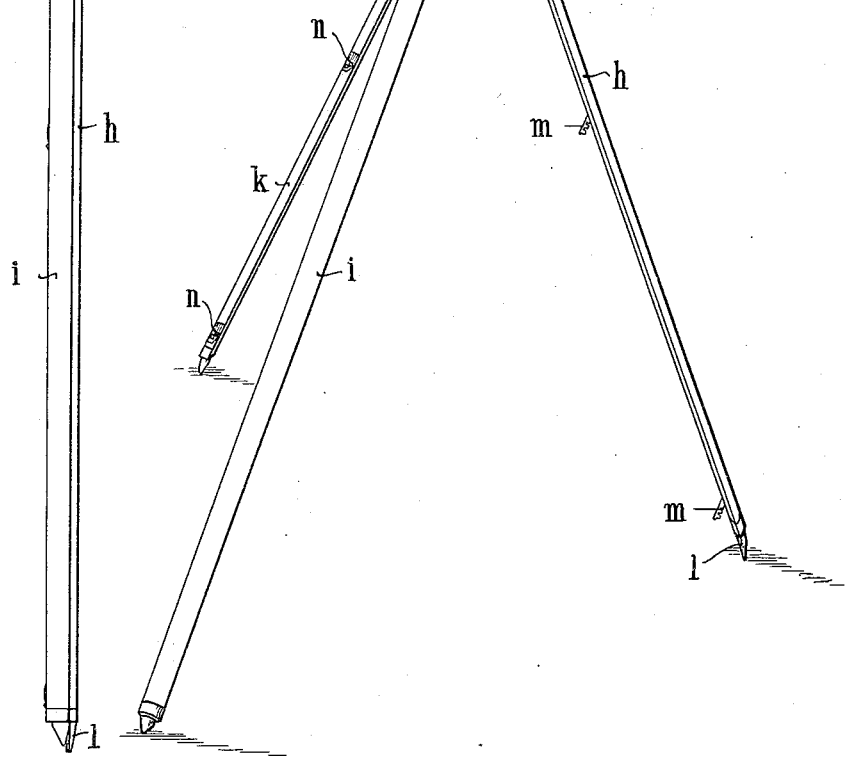

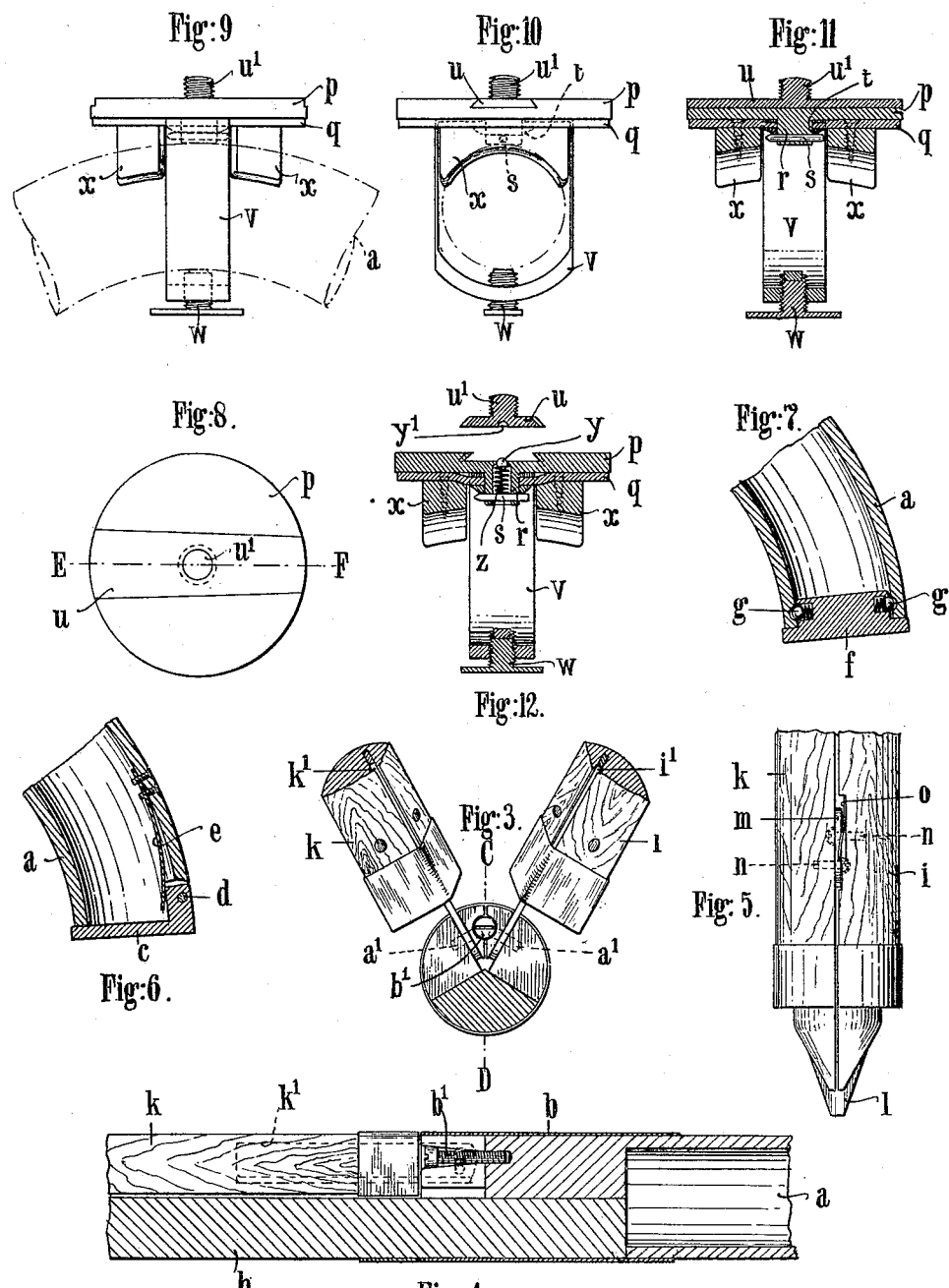

UNITED STATES PATENT OFFICE.

HENRY ROTTENBURG, OF CAMBRIDGE, ENGLAND.

CAMERA-STAND.

1,138,417.  Specification of Letters Patent.  Patented May 4, 1915.

Application filed April 25, 1914. Serial No. 834,443.

*To all whom it may concern:*

Be it known that I, HENRY ROTTENBURG, a subject of the King of Great Britain, residing at Cambridge, in the county of Cambridge, England, have invented new and useful Improvements in Camera-Stands, of which the following is a specification.

This invention relates to camera stands adapted to be used as walking sticks when folded, and to be opened out when required to form a camera stand.

It is the principal object of this invention to provide a stand of this type which will be simple and strong in construction while being comparatively light.

Further objects are to construct the stand so that when it is being used as a walking stick there shall be no stress upon the hinges of the legs; to construct the hinges so that they will be strong, and can be tightened up readily whenever required; to construct the handle so that it may serve to support a camera in any required angular position; to form the handle as a convenient receptacle for a shutter release appliance or the like; and to provide an improved form of attachment or base for the camera, said attachment being adapted to be clamped on the handle of the stick, and to be secured in its position of adjustment in a single clamping operation.

These and other objects will be apparent from the description which follows.

The invention is illustrated in the accompanying drawings wherein:—

Figure 1 shows the appliance complete, folded up for use as a walking stick. Fig. 2 shows the appliance opened out and in use as a camera stand. Fig. 3 shows a section on the line A—B of Fig. 2, looking upward toward the handle with the legs opened out. Fig. 4 shows a longitudinal section on the line C—D of Fig. 3. Fig. 5 shows a detail view of the lower end of the stand when folded for use as a walking stick. Fig. 6 is a detail view showing in section the end of the handle with the cap thereof. Fig. 7 is a similar view to Fig. 6 showing a modification. Fig. 8 is a plan view of the plate or attachment for the camera. Fig. 9 is a side elevation thereof. Fig. 10 is an end elevation thereof. Fig. 11 shows a section on the line E—F of Fig. 8. Fig. 12 shows a section similar to that of Fig. 11, illustrating a modification, the top plate being turned through 90° as compared with Fig. 11.

Referring to the drawings, $a$ is the handle member which is preferably formed of aluminium and is in the shape of a crook of circular curvature. This handle member is hollow as seen in Figs. 4, 6 and 7, and it is adapted to accommodate in the interior thereof any suitable appliance associated with a photographic camera, such for instance as a flexible shutter release appliance. The handle is closed at its outer end by a cap or lid such as $c$, Fig. 6, wherein the lid is shown as being hinged at $d$, and pressed by a spring $e$ which serves to hold it either in the closed position or in the open position when turned outward through 90°. In the modification shown in Fig. 7 a cap $f$ with spring-pressed balls $g$ therein adapted to engage in a groove adjacent to the end of the handle, serves a similar purpose, the said cap being pressed in or pulled out bodily when required.

The handle member $a$ fits into a metallic shell $b$, and it carries the three legs $h$, $i$ and $k$. The leg $h$ is rigidly attached to the sleeve $b$ and handle $a$ in any suitable manner. The legs $i$ and $k$ are hinged to the handle $a$. The three legs when folded form a rounded stem for the stick as seen in Fig. 1, or when opened out form a camera stand as seen in Fig. 2. Each of the legs is provided with a spike at its lower end, but the spike $l$ at the lower end of the leg $h$ is made considerably longer than the spikes at the ends of the legs $i$ and $k$, so that when the stand is in use as a walking stick, the spike $l$ of the leg $h$ will be the only one which comes into contact with a hard ground surface, and any shock from the ground will be transmitted through the rigid leg $h$ to the handle, and not through the hinged legs $i$ and $k$. In this way the hinges are protected from shock and they consequently last longer. The legs are held when in the closed position by suitable catches such as $m$ both pivoted on one of the legs, preferably the leg $h$, and engaging with studs $n$, each catch $m$ having two notches for instance, one engaging with a stud $n$ on one leg, and the other with a corresponding stud on the other leg. A spring $o$, Fig. 5, beside each catch $m$ may serve to hold it in the closed position. This catch device is only mentioned by way of example, and any suitable alternative catch device may be used for holding the legs closed.

The legs $i$ and $k$ are connected to the handle portion $a$ in the following manner:—Plates $i'$ and $k'$ are attached to legs $i$, $k$ and project therefrom, passing into slots formed in the handle $a$ and sleeve $b$, wherein they are held by pivots $a'$ shown in dotted lines in Fig. 3. The angle between the hinges is preferably 60 degrees as shown in Fig. 3. In order to enable the joints to be tightened if they tend to become loose at any time, the handle $a$ is slit longitudinally for a short distance in the plane of the section line C—D in Fig. 3, that is to say between the slots in which the plates $k'$ and $i'$ work. A screw $b'$ with a conical shaped head engages in the handle member $a$ in the plane of the longitudinal slit therein, and as it is screwed up it serves to spread apart the two sector-shaped portions of the handle member at each side of the screw causing them to press against plates $i'$ and $k'$ thus holding them again securely against lateral movement in their slots.

For the purpose of holding the camera on the crook-shaped handle $a$ of the device, an attachment is used constructed as follows:—
A circular plate $p$ is provided connected by a central pivot to a second plate $q$. In Fig. 11 the central pivot is shown as a projection $r$ on the plate $p$ passing through a central aperture in the plate $q$, and held by a transverse pin $s$ and a washer $t$. A transverse groove or slot with undercut edges is formed in the top of the plate $p$, and a slide member $u$ with correspondingly shaped edges fits in said groove. The sides of the groove and of the slide $u$ are preferably inclined to one another at an angle within the angle of friction, preferably about 10° as shown in Fig. 8, in order to facilitate the insertion of the slide $u$ in the transverse groove, and the gripping thereof in the groove when in the correct position. The slide $u$ has a pin $u'$ thereon adapted to be screwed into the base of a camera in the known manner. A camera is shown mounted on the device in Fig. 2. The slide $u$ is normally left attached permanently to the camera and is fitted in the groove of the plate $p$ whenever the camera is required to be used on the stand.

The plate $q$ has a frame $v$ adapted to embrace the crook-shaped handle $a$ as indicated in Figs. 1 and 2, and to be clamped in position thereon by a set screw $w$. On the back of the plate $q$ at each side of the frame $v$ rounded shoulder pieces $x$ are attached adapted to fit over the curved surface of the handle $a$ as seen in Fig. 9. When the screw $w$ is tightened it pulls the frame $v$ downward over the handle $a$, while the shoulder pieces $x$ press upward the plate $q$ at each side of the part attached to the frame $v$. The result is that the plate $q$ is slightly distorted or curved, and it thus becomes clamped against the back of the plate $p$, resisting any further or unintentional turning movement of the plate $p$ on the plate $q$.

It will be seen that the attachment can be clamped in any position at any portion of the crook-shaped handle member $a$ so that the camera can be set at any required angle on the stand, while it can be turned in the plane of turning of the plate $p$ to any required position until the screw $w$ is finally tightened to its full extent.

In order to hold the slide $u$ when in its mid position a spring stop device may be provided as indicated for example in Fig. 12. In this figure a steel ball $y$ is shown pressed upward by a spring $z$ in a central opening in the pivot portion $r$ of the plate $p$, and the ball $y$ projects to some extent through a hole in the base of the groove in the plate $p$, the hole having shoulders which prevent the ball $y$ from coming out. Then in the underside of the slide $u$ a recess $y'$ is formed in a central position corresponding with that of the ball $y$, so that the ball will engage in this recess when the slide $u$ has been pushed in to its mid position on the plate $p$. The ball $y$ will be pressed down by the shoulder of the recess $y'$ when the slide is pressed with sufficient force laterally in removing it from the plate $p$.

It will be evident that many of the details of construction of the device can be modified without departing from the scope of the invention as hereinbefore set forth and as defined by the claims.

Having thus described my invention, what I claim as new and desire to secure by Letters Patent:—

1. A folding camera stand adapted to be used also as a walking stick, and comprising a handle, a leg attached thereto, two further legs with projections thereon engaging in slots in the handle portion, pivots in the handle portion passing through said projections and means for tightening the joints, comprising a member adapted when turned to engage with a wedging action against faces formed in the two parts of the handle portion separated by a slot, whereby when the member having a wedging action is turned, the two parts of the handle portion are separated and are pressed toward the projections on the legs.

2. A folding camera stand adapted to be used also as a walking stick, and comprising a handle, one leg rigidly secured to said handle, two further legs, projections on said legs passing into slots in the handle member, one at each side of a longitudinal cut therein, pivots for the projections of said legs, and a screw with a conical portion adapted to engage in the handle member along the line of the longitudinal cut, whereby when the screw is tightened the portions of the handle member between the longitudinal cut and the slots for the leg projections, are pressed apart to bind said leg projections and to take up lateral looseness.

3. A folding camera stand adapted to be used also as a walking stick, and comprising a handle formed as a hollow member of crook-shape, legs connected thereto and adapted to be opened out for use as a stand, and a cap on the end of said handle adapted to close the end thereof and to be opened in order to give access to the interior.

4. A folding camera stand adapted to be used also as a walking stick, and comprising a handle formed as a hollow member of crook-shape, legs connected thereto and adapted to be opened out for use as a stand, a cap on the free end of said handle, a hinge therefor and a spring pressing against a portion of the cap adjacent to said hinge, whereby the cap is held with a spring action in the closed position.

5. A folding camera stand adapted to be used also as a walking stick, and comprising a handle of crook-shape, legs with means attaching them thereto in such manner that they can be opened out when required, or kept closed together, and an attachment adapted to fit on the crook handle and to carry the camera thereon, said attachment including means for clamping it securely on the handle and a part for engaging with a camera.

6. A folding camera stand adapted to be used also as a walking stick, and comprising a handle of crook-shape, legs with means attaching them thereto in such manner that they can be opened out when required, or kept closed together, and an attachment adapted to fit on the crook handle and to carry the camera thereon, said attachment comprising a plate with means for clamping it in any desired position on the crook handle, said plate having a transverse undercut slot therein and a slide adapted to be attached to the camera and to engage in the slot in the plate.

7. A folding camera stand adapted to be used also as a walking stick, and comprising a handle of crook-shape, legs with means attaching them thereto in such manner that they can be opened out when required, or kept closed together, and an attachment adapted to fit on the crook handle and to carry the camera thereon, said attachment comprising a plate with an undercut slot therein, a slide adapted to fit in said undercut slot, means for holding the slide when in a central position, and a clamp for securing the plate in any desired position on the crook.

8. A folding camera stand adapted to be used also as a walking stick, and comprising a handle of crook-shape, legs with means attaching them thereto in such manner that they can be opened out when required, or kept closed together, and an attachment adapted to fit on the crook handle and to carry the camera thereon, said attachment comprising a plate with an undercut transverse slot in the face thereof, the sides of which approach one another toward one end, a slide adapted to fit in said undercut slot and having its sides correspondingly formed, a second plate and means pivotally connecting it with the first plate, a loop with clamping means thereon attached to said second plate and adapted to embrace the crook handle, and two shoulder pieces on the back of said second plate adapted to rest upon the crook of the handle, whereby when the clamp is tightened the second plate will be slightly distorted by the pull of the clamp on the middle thereof and by the thrust of the two shoulder portions, the said distortion serving to clamp the first plate tightly against the distorted second plate, holding it against further pivoting movement.

9. In a folding camera stand, the combination of legs with means pivotally connecting them together, a crook-shaped member carried by said legs and an attachment for the camera adapted to be clamped on said crook-shaped member, the attachment comprising a plate, a member adapted to engage said plate and to be secured to a camera, a second plate at the back of the first plate and means pivotally connecting it to said first plate, a frame extending from each side of the second plate and adapted to embrace the crook-shaped member, a screw adapted to engage in the frame and to clamp against the underside of the crook-shaped member, and shoulders on the back of the second plate, one at each side of said frame, said shoulders being adapted to rest against the curved surface of the crook-shaped member, whereby when the screw is tightened to clamp said frame on the crook-shaped member, the frame is caused to pull downward the middle portion of the second plate, while the two end portions thereof are pressed up by the shoulders, thus slightly distorting the second plate and causing it to grip against the first plate.

10. A folding camera stand adapted to be used also as a walking stick, and comprising a handle of crook-shape, legs with means attaching them thereto in such manner that they can be opened out when required, or kept closed together, and an attachment adapted to fit on the crook handle and to carry the camera thereon, said attachment comprising a plate with an undercut transverse slot in the face thereof, the sides of which approach one another toward one end, a slide adapted to fit in said undercut slot and having its sides correspondingly formed, a rounded member and a spring pressing it upward so as to project slightly through an opening in the base of the grooved portion of said plate, said rounded member being adapted to engage in a recess in a corresponding position in the slide, and thus to hold said slide when inserted, and means for clamping said plate in any desired position on the crook-shaped handle portion of the device.

11. A folding camera stand, comprising a stem portion formed as a handle, and means for supporting a camera in any angular position thereon, a leg rigid with said stem, and a plurality of other legs with hinges therefor connecting them to the said stem in such manner that they can be opened out for use, or folded together.

12. As an article of manufacture, the attachment comprising the plates $p$ and $q$, means pivotally connecting the same, the frame $v$, and means for clamping the same to a support, the shoulders $x$ on the plate $q$, and means for mounting a camera on the plate $p$.

13. As an article of manufacture, the stick comprising a handle $a$, and three legs $h$, $i$ and $k$, the one leg $h$ rigidly attached to said handle, hinges connecting the legs $i$ and $k$ to said handle, and means for holding the three legs together when in the closed position.

In witness whereof, I have hereunto signed my name this April, 1914, in the presence of two subscribing witnesses.

HENRY ROTTENBURG.

Witnesses:
HUBERT A. GILL,
H. W. BLAKE.

Copies of this patent may be obtained for five cents each, by addressing the "Commissioner of Patents, Washington, D. C."